Figure 1:
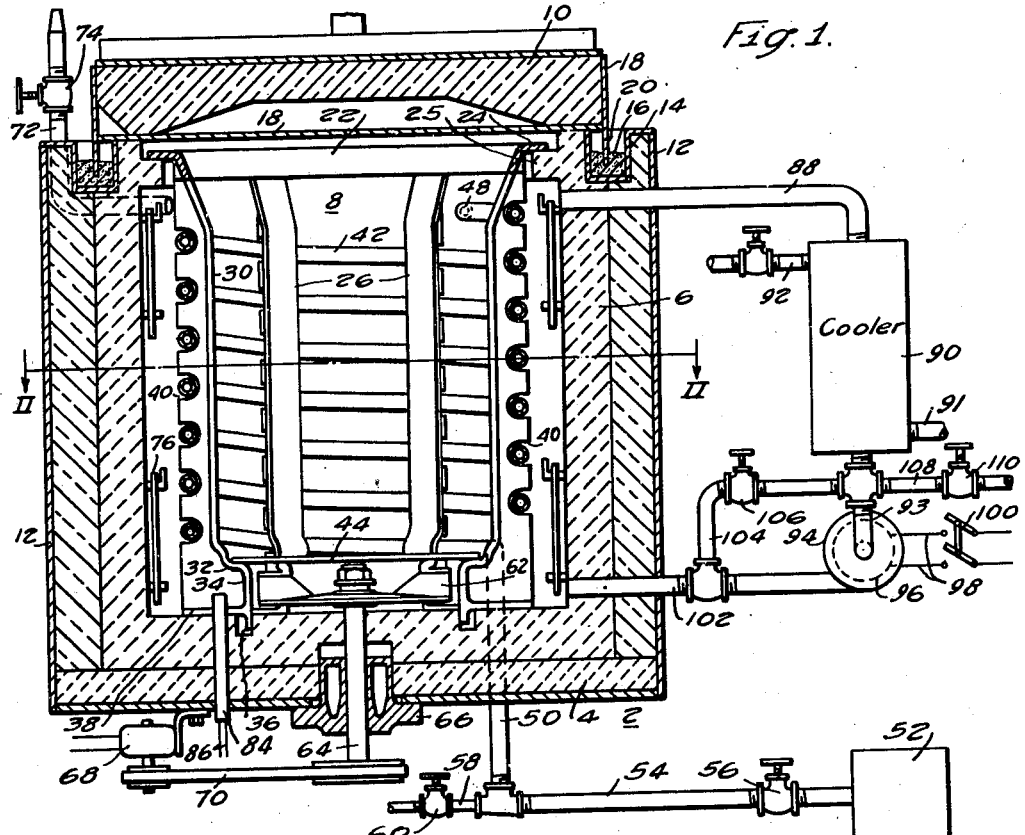

Aug. 2, 1949.  J. H. GERMANY  2,477,796
HEAT-TREATING FURNACE
Filed Jan. 28, 1943

WITNESSES:

INVENTOR
James H. Germany
BY O. B. Buchanan
ATTORNEY

Patented Aug. 2, 1949

2,477,796

UNITED STATES PATENT OFFICE 2,477,796

HEAT-TREATING FURNACE

James H. Germany, Edgewood, Pa., assignor to Westinghouse Electric Corporation, East Pittsburgh, Pa., a corporation of Pennsylvania Application January 28, 1943, Serial No. 473,846

2 Claims. (Cl. 266—5)

My invention generally relates to means for treating metal objects by processes which involve the heating or the heating and cooling of the metal objects in a recirculated atmosphere, more especially, a controlled atmosphere desirable for the particular treating process; and also relates to a furnace system comprising a top-charging pit-type furnace in which a controlled atmosphere may be preheated, dissociated, or combusted, or combinations thereof, and then recirculated about and through a charge comprising numerous small metal objects or workpieces.

It is an object of my invention to provide a general-purpose pit-type furnace system in which charges can be treated in numerous different ways including, for example, tempering, annealing, nitriding, carburizing, or other processes involving the envelopment of heated charges by rapidly moving gaseous atmospheres which may be either inert to or reactive with the charges.

It is an object of my invention to provide an atmosphere-permeated furnace having a coil or tortuous pipe means in its charge-treating or heat-treatment chamber, through which incoming controlled atmosphere is passed before being discharged into the chamber where an internal fan in the chamber recirculates the atmosphere in orbits which lie entirely within the chamber. This pipe means is made of extended length by forming it with return-bends, preferably as a helix, and is exposed and mounted in the heat-treatment chamber so that a heating means for heating the furnace charge will also heat the gas passing through the pipe means. In the embodiment described, this helical pipe means is mounted on an open framework which is also adapted to receive a suitable work-basket of any common or suitable form, containing the articles to be treated, so that a common structure supports the furnace charge and the pipe means.

Another object of my invention is to provide furnace equipment including a furnace of a type described having a heat-treatment chamber in which may be carried out heat-treating processes requiring a cooling of the heated charge in a protective or controlled atmosphere, the furnace system comprising a gas-cooling system outside of the heat-treatment chamber into which controlled atmosphere may be directed, after the charge has been heated, so that the charge may be cooled in essentially the same atmosphere. Preferably, the operation of the internal fan is continued while the gas is being recirculated through the gas-cooling system so that a more uniform and more rapid cooling results.

It is an object of my invention to provide a furnace which can be used for bright carburizing, the furnace having a distinct gas-dissociating means in the charge-treatment chamber, through which gases are passed to be preheated and dissociated or cracked before being discharged into the heat-treatment chamber in which it envelopes the charge therein. In a preferred embodiment of my invention, this dissociating means comprises the aforementioned helical pipe means which is of a size to encompass the work-receiving basket which holds the numerous small workpieces to be carburized; the pipe means having an inlet end for receiving the supply gases from outside the furnace, and an outlet end within the heat-treatment chamber.

A further object of my invention is to provide metallurgical equipment including a furnace having a single heating-chamber in which a charge-basket and a tortuous pipe means are disposed. Raw gases can be supplied to the pipe means which discharges directly into the chamber. In their passage through the pipe means the gases are caused to react or dissociate, by the heat of the chamber, into gases suitable for carburizing workpieces in the basket. The furnace system includes a gas-cooling means or system for cooling carburized workpieces by recirculating cooled gas about them.

The carburized workpieces are preferably cooled while in the heat-treatment chamber and out of contact with air or other oxidizing or surface contaminating gases. In accordance with this feature of my invention, the gas-cooling system is connected to the heat-treatment chamber and provides a separate additional gas-circulating path which is superimposable on the internal recirculating path within the chamber. By lowering or cutting off the heating means while the gas is being circulated through the gas-cooling means, the workpieces can be reduced to a safe handling temperature while enveloped by a protective atmosphere.

Many novel features, advantages, methods, processes and innovations of my invention, in addition to the foregoing, will be discernible from the following description thereof, which is to be taken in connection with the accompanying somewhat abbreviated and schematic drawings.

Figure 2:
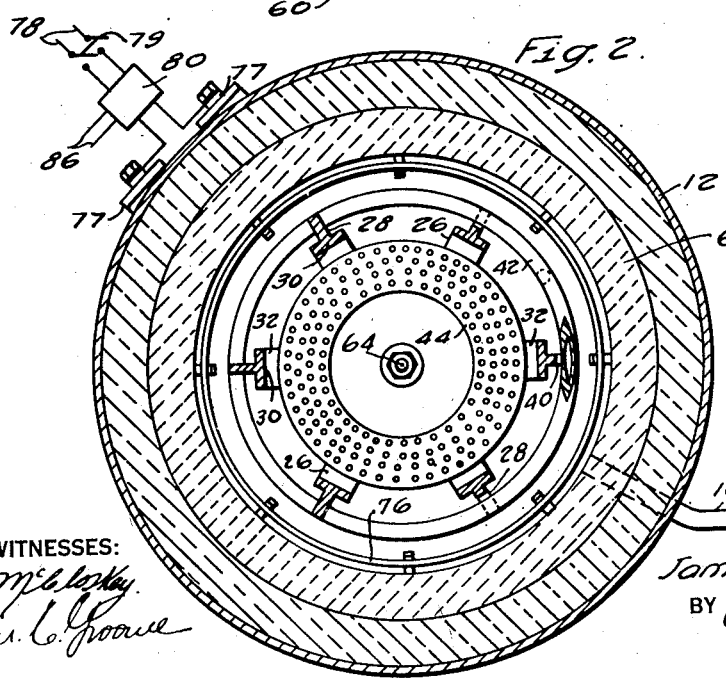

In the drawing:

Figure 1 is a vertical view, partly in section and partly in elevation, of a furnace system embodying my invention; and Fig. 2 is a horizontal sectional view of the furnace of the system substantially on the line II—II of Fig. 1, some parts being omitted for clarity.

The heat-treating means or furnace system comprises a pit-type furnace, indicated in its entirety by the reference numeral 2, which can be supported in elevated position by any suitable means or legs. The furnace comprises any suitable refractory and heat-insulating brickwork comprising a bottom-wall 4 and side-walls 6 defining a cylindrical heat-treatment or charge-receiving chamber 8 which is open at the top to provide a work-opening through which a charge may be lowered into and raised from the chamber. The work-opening is adapted to be closed by a movable closure 10 capable of being raised from and lowered into the closing position in which it is shown in Fig. 1.

The outside of the walls of the furnace are provided with a suitable outer metallic shell 12 provided with a round trough 14 adapted to hold a sealing medium 16. The closure 10 is encased in a metallic shell 18 having a depending peripheral flange 20 which cooperates with the sealing medium 16 for gas-sealing the work-opening. The metallic shells and the gas-seal protect the furnace against the infiltration of air, as is customary in furnaces of this type.

Charge-guiding means are provided for positioning a charge inside the heat-treatment chamber, the charge guiding means comprising an upper annular casting 22 provided with a horizontal peripheral lip 24 adapted to rest on a circular ledge 25 near the top of the side-walls 6. A plurality of relatively narrow guide members 26 are secured to and depend from the casing 22. Each guide member is somewhat T-shaped in cross-section, as shown in Fig. 2, comprising a leg 28 and a cross bar 30. The bottom portion of each guide member comprises an inwardly turned plate-supporting member 32, and a vertical locking member 34 extending downwardly therefrom, the locking member sitting into a positioning groove 36 in the bottom-wall 4. A short horizontal base plate 38 extends from this locking member and rests on the bottom wall 4, the bottom of the leg 28 being unitary with this base plate.

Each of the guide members 26 is provided with a plurality of grooves 40 spaced along the outer edge of the leg 28 for receiving the turns of a coiled gas-dissociating pipe means 42; the grooves 40 on the different guide members being differently and properly positioned in accordance with the helical form of the pipe means and spaced from the cross bars 30 to permit gas-flow in the same direction on both sides of the pipe, the side toward the heating means and the side toward the charge.

A well perforated annular charge-supporting plate 44 rests on the plate-supporting members 32. A charge, which usually comprises a basket having a perforated bottom and a somewhat solid cylindrical side-wall having an upper edge which terminates below the bottom of the casting 22, for gas-flow between the casting 22 and this edge, can be lowered into the furnace, the charge-guiding means directing the charge onto the perforated charge-supporting plate 44.

The pipe means 42 has an open discharge end 48 near the top of the heat-treatment chamber, the other end of this pipe means being disconnectibly secured to a pipe connection 50 passing through the bottom-wall 4. A source of raw ammonia gas 52 is connected to the pipe connection 50 by a pipe 54 having an adjustable valve 56 therein; and a source of carburizing gas is also connected to the pipe connection 50 by a pipe 58 having an adjustable valve 60 therein.

For recirculating the atmosphere within the furnace, a fan 62 is provided below the annular charge-supporting plate 44, the fan being rotated by a shaft 64 passing through the bottom-wall 4 and a water-cooled bearing 66, the shaft being driven by a motor 68 through a belt means 70. For controllable venting spent gas from the heat-treatment chamber, a vent pipe 72 is provided having an adjustable valve 74 therein.

Electrical heating means 76 are disposed on the side walls 6 of the furnace, being connected in any suitable manner to insulated outside terminals 77 connected to any suitable power conductors 78 through a disconnect switch 79 and a power controlling means 80, by means of which the supply of energy to the heating means may be controlled or even disconnected under the control of a temperature-responsive means 84 comprising a thermocouple having wires 86 leading to the power controlling means 80.

The gas-cooling system comprises an inlet pipe 88 which can take atmosphere from near the top of the heat-treatment chamber 8 and convey it to a gas-cooler 90, outside the pit-type furnace 2. The cooler may be of any type and is shown as including a water inlet 91 and a water outlet 92 for cooling the gas-conveying pipe means within the gas-cooler 90, which pass therethrough to a pipe 93 connected to the inlet of a blower 94 driven by a motor 96 energized through power lines 98 which include a disconnecting switch 100. The blower exhaust is connected to a pipe 102 which discharges the cooled gas near the bottom of the heat-treatment chamber 8. A surge by-pass 104 including a valve 106 is connected between the pipes 93 and 102, the valve 106 being opened when the blower is started and then shortly thereafter slowly closed. An air inlet 108 controlled by a valve 110 is also connected to the pipe 93.

In operation, the temperature of the furnace is controlled through the temperature-responsive means 84 to any desired degree. Operation of the fan 62 causes the gaseous atmosphere in the furnace to recirculate in substantially vertical closed orbits passing through the charge in one direction, and about the pipe means 42 and in heat exchange relation with the heating means 76 in the other direction.

If all the valves are closed, except perhaps the vent-valve 74, and the furnace chamber 8 permitted to be filled with air, the furnace is useful for air-tempering.

In the event a protective or controlled atmosphere is desired within the furnace chamber, opening of the valve 56 permits raw ammonia gas to be fed to the tortuous pipe means 42. In flowing through the pipe means 42, the ammonia gas is preheated and dissociated into nitrogen and hydrogen when the temperature of the furnace chamber is sufficiently high. With dissociated ammonia in the chamber 8, a gas is provided which may be used in processes requiring such a gas, as, for example, annealing metal to which such atmosphere is inert. The fan 62 will recirculate this atmosphere, and when cooling of the charge is desired, the heating power supply can be suitably controlled or cut off and the blower 94 started.

For nitriding, it may be desirable to disconnect the coiled pipe means 42 from the pipe 50 so that the raw ammonia gas fed through the pipe 50 will dissociate in contact with the metal objects being treated.

Carburizing is carried out at temperatures considerably in excess of those required for nitriding and usually on different steels. For such carburizing, the pipe means 42 is connected to the pipe 50, and both the valves 56 and 60 opened so that the supply gases comprise controllable amounts of raw ammonia gas and carburizing gas, the ammonia gas being substantially completely dissociated in the pipe means 42 before being discharged into the furnace through the outlet opening 48, when the chamber 8 is at carburizing temperatures of about 930° C. In a carburizing process, the valve 74 should be opened slightly for venting spent gases, the spent gases being ignited at a burner tip provided at the end of the pipe 72.

After a heating treatment in a controlled atmosphere the charge can be cooled by controlling or shutting off the heating power supply and starting the blower 94, preferably with the fan 62 in operation, the valve 110 remaining closed during the heat-treating of charges requiring an enveloping controlled atmosphere. During cooling, two intermingled paths are provided for the moving gas. One includes the blower 94 which causes gas to circulate in a path including the gas-cooler 90 and heat-treating chamber 8; and the other includes the fan 62 which causes gas to move in orbits inside the heat-treating chamber 8.

In preparing the furnace for treating processes requiring a controlled atmosphere, it is desirable to first purge air and occluded moisture or other obnoxious gases from the furnace system during the heating up period and perhaps before. To this end, it is desirable to pass only raw ammonia gas through the heat-treatment chamber and the gas-cooling system, with the fan and blower operating, while venting a considerable portion of the ammonia gas through the vent pipe 72, discharged ammonia gas being burned. This purging by raw ammonia gas is further desirable for reasons of safety, and should also be done at the completion of a heat-treating process involving a controlled atmosphere before the closure 10 is lifted; but at such end of a heat-treating process at which the charge has been cooled to safe handling temperatures, it is also desirable to fill the heat-treatment chamber 8 with air to avoid a rapid discharge of ammonia into the room containing the furnace, upon lifting of the closure 10. Consequently, the valve 110 need be open only during this final stage of such a heat-treating process.

In an actual process carried out in the described furnace system, a purging operation involved treating the furnace system with raw ammonia gas with the furnace only slightly heated so as to drive out moisture, the water-flow through the gas-cooler 90 being temporarily stopped, if desired. After the furnace had been heated above the boiling point of water for some time, say, about an hour, 5% of methane was added to the raw ammonia. As the temperature rose in the furnace, the percentage dissociation of ammonia increased until finally it was substantially completely dissociated when the temperature reached the carburizing range of about 930° C. While the furnace was at this temperature, the percentage of methane was increased for a time to 10% and finally to 15% for the balance of the soaking period of several hours, after which the methane supply was cut off, and the charge cooled by recirculating the atmosphere through the gas-cooling system with the fan 62 in operation and the carburizing supply cut off at the valve 60. This cooling was continued until a safe temperature of about 125° C. was reached, at which there was substantially no ammonia dissociation. Before lifting the closure 10, the ammonia gas supply valve 56 was closed and the valve 110 opened, the valve 74, remaining open.

Air supplied by the blower to the heat-treatment chamber 8 displaced the atmosphere in the furnace which burned for a time at the vent pipe 72. When the atmosphere in the furnace chamber 8 became substantially non-obnoxious, the charge was removed. The carburized articles so treated had untarnished surfaces.

In carburizing process using high percentages of carburizing gas for long periods, soot may sometimes deposit on the metal furnace-parts in the furnace-system, but such soot can be easily burned out by heating the furnace while passing air through it. Soot may also deposit sometimes on some of the treated metal objects, but such soot is of a type which readily wipes off.

While I have described my invention in a preferred form, it is obvious that it is subject to wide variation and modification within the limits of the teachings thereof.

I claim as my invention:

1. A furnace comprising refractory and insulating walls providing a charge-receiving chamber having a top work-opening, heating means along said walls, a plurality of spaced charge-guiding bar-members positioned in said furnace and extending substantially for the length of said chamber, a gas-reaction means for discharging gas into said chamber, said gas-reaction means comprising a multi-bend return-bend pipe supported by said charge-guiding members in spaced relation to said chamber and heating means, whereby an atmosphere flowing through said pipe may react therein, said pipe having a gas-discharge opening in said chamber, and means comprising a fan-propeller in said chamber, for recirculating said gas with the atmosphere within said chamber, in paths including orbits passing in the same direction on both sides of said pipe.

2. The structure of claim 1 characterized by said gas-reaction means including a gas-inlet means extending from outside said furnace to said pipe, said pipe comprising a helix having a vertical axis.

JAMES H. GERMANY.

REFERENCES CITED

The following references are of record in the file of this patent:

UNITED STATES PATENTS

| Number | Name | Date |
| --- | --- | --- |
| 1,013,191 | Machlet | Jan. 2, 1912 |
| 1,794,151 | Cope | Feb. 24, 1931 |
| 1,867,737 | Fletcher | July 19, 1932 |
| 1,869,025 | Seastone | July 26, 1932 |
| 1,926,234 | Harsch | Sept. 12, 1933 |
| 1,938,306 | Webb | Dec. 5, 1933 |
| 1,976,557 | Haskell | Oct. 9, 1934 |
| 1,984,665 | Tone | Dec. 18, 1934 |
| 2,013,809 | Salisbury | Sept. 10, 1935 |
| 2,085,584 | Haskell | June 29, 1937 |
| 2,137,869 | Woodson | Nov. 22, 1938 |
| 2,161,162 | Harsch | June 6, 1939 |
| 2,176,473 | Rosecrans | Oct. 17, 1939 |
| 2,187,589 | Lenel | Jan. 16, 1940 |
| 2,221,583 | Hoop | Nov. 12, 1940 |
| 2,236,728 | Given | Apr. 1, 1941 |
| 2,240,146 | Ness | Apr. 29, 1941 |
| 2,278,204 | Lewis | Mar. 31, 1942 |
| 2,311,344 | Machlet | Feb. 16, 1943 |
| 2,329,896 | Harsch | Sept. 21, 1943 |